US006372878B1

(12) United States Patent
Wernik et al.

(10) Patent No.: US 6,372,878 B1
(45) Date of Patent: Apr. 16, 2002

(54) RESOLS, PROCESS FOR THEIR PRODUCTION AND USE

(75) Inventors: Sonja Wernik, Iserlohn; H. Juergen Dern, Menden; Athina Kerkaidou, Iserlohn; Stephan Schroeter, Essen, all of (DE)

(73) Assignee: Bakelite AG (DE)

( * ) Notice: Subject to any disclaimer, the term of this patent is extended or adjusted under 35 U.S.C. 154(b) by 0 days.

(21) Appl. No.: 09/617,166

(22) Filed: Jul. 17, 2000

(30) Foreign Application Priority Data

Aug. 13, 1999 (DE) .......................... 199 37 858

(51) Int. Cl.⁷ ........................ C08G 14/04; C08G 8/10
(52) U.S. Cl. ...................... 528/141; 528/129; 528/137; 528/140; 528/158
(58) Field of Search ................ 528/141, 129, 528/137, 140, 158

(56) References Cited

U.S. PATENT DOCUMENTS 5,310,855 A    5/1994    Walz et al.
5,607,990 A    3/1997    Dorn et al.
5,864,003 A *  1/1999    Qureshi et al. ............. 528/141

FOREIGN PATENT DOCUMENTS

CA    2000341    4/1991
GB    1604657    12/1981

* cited by examiner

*Primary Examiner*—Duc Truong
(74) *Attorney, Agent, or Firm*—Bierman, Muserlian and Lucas

(57) ABSTRACT

Resols modified with organic phosphonic acids and/or phosphinic acids or their alkali and/or alkaline-earth metal salts obtained by reacting phenolic compounds and aldehyde in an alkaline medium in a molar ratio of the phenolic compounds to the aldehyde in a range from 1:0.3 to 1:6, with the reaction mixture comprising 0.1 to 10 percent by weight of at least one organic phosphonic acids and/or phosphinic acids or their alkali and/or alkaline-earth metal salts.

19 Claims, No Drawings

RESOLS, PROCESS FOR THEIR PRODUCTION AND USE

The invention relates to bright-curing phenolic resins condensed in an alkaline medium.

STATE OF THE ART

Due to their good physical properties and excellent thermal resistance and chemical stability, phenolic resins are used in many fields of application. Unfortunately, they have the disadvantage of becoming discolored during storage and particularly during curing. This strongly restricts the fields in which they can be used particularly as coatings or in the field of varnishes and lacquers (cf. Ullmann's Encyclopedia of Industrial Chemistry, Fifth Edition, Vol. 18, 1991, Page 418).

It is possible to obtain brighter films (cf. Knop, Pilato: Phenolic Resins; Springer Verlag 1985, Page 248) by etherification of the resols. Etherified resols, however, have the disadvantage that they are not water-dilutable or only to a limited extent. In addition, they have longer curing times which means lower reactivity than non-etherified resols. The resins, furthermore, still contain solvents or, at elevated temperatures, their cleavage results in by-products, most often alcohols, used for the etherification.

It is known from EP-A 0 442 218 that color-stabilized phenolic resols catalyzed with an alkali metal hydroxide can be produced by adding ammonia salts or complexes and the addition of these salts stabilizes the color of the resins when curing them at temperatures up to 150° C. However, the brightening effect is insufficient, especially if these resols are cured at higher temperatures.

OBJECTS OF THE INVENTION

It is an object of the invention to provide resols with good water-dilutability properties, which are not discolored and which are bright-curing even at elevated temperatures without the chemical and physical properties of the cured products being degraded.

It is another object of the invention to expand the fields of application of phenolic resins.

These and other objects and advantages of the invention will become obvious from the following detailed description of the invention.

DESCRIPTION OF THE INVENTION

The resols of the invention are modified with at least one member selected from the group consisting of organic phosphonic acid, organic phosphinic acid and their alkali metal and alkaline earth metal salts. The resins are preferably used as binder for abrasive grain in grinding materials, particularly as size coat binder in coated abrasives or as binder for coatings, printing inks, adhesives, lacquers, molding materials, particularly bright molding materials, foams or formed fiber elements or for the production of laminates, particularly decorative laminates and as impregnation resins.

It has been found that resols modified with organic phosphonic acids and/or phosphinic acids or their alkali and or alkaline-earth metal salts are bright and transparent, that they remain bright even after relatively long storage periods and they do not become discolored even during curing at temperatures up to 150° C.

It is known from EP-A 14625 to make transparent polycarbonates produced from bisphenols, phosgene and a diester or an alkali metal hemiester of a phosphonic acid. However, this process cannot be applied in the case of resols as no brightening is attained through addition of phosphonic acids or salts of phosphonic acids to resols.

However, it has been found that bright resols are formed if, before the condensation reaction comprising phenolic compounds, aldehydes and alkaline condensation reagents, are added organic phosphonic acid(s) and/or phosphinic acid(s) or their alkali and/or alkaline-earth metal salts are added to the reaction mixture. The phenolic compound(s) and the organic phosphonic acid(s) and/or phosphinic acid (s) or their alkali or alkaline-earth metal salts are preferably mixed with one another before the addition of the alkaline catalyst. The organic phosphonic acids as well as the phosphinic acids or their salts react during the condensation reaction with one or several components of the reaction mixture whereby the bright resols modified with organic phosphonic acids and/or phosphinic acids are formed. The reaction has not been specified so far.

To carry out the akaline condensation reaction, phenolic compounds and aldehydes are used in a molar ratio of 1:0.3 to 1:6. As alkaline catalysts, all compounds known for the resol production, such as, for example, alkali and/or alkaline-earth metal hydroxides, ammonia or amines, alkali metal sulfites can be used and, specifically for the ortho-condensed resols, organic salts of bivalent metals such as, for example, zinc acetate (cf. Houben Weyl, Vol. E20 "Makromolekulare Stoffe", part 3 (1987), page 1804). The amount of catalyst used is also within the range conventional in known phenolic resols syntheses. The condensation reaction takes place in a manner known per se by heating the reagents for several hours in aqueous alkaline solution.

Examples of the phenolic compounds are preferably phenol, but also aliphatically or aromatically substituted phenols, as well as multivalent phenols. Specific examples are cresols, xylenols, tert.butyl or octyl phenol, naphthols, p-phenyl phenol, bisphenols or resorcinol, but also natural substances, such as, for example, tannins, cardenol or cardol. The phenolic compounds can be used as single compounds or in any desired mixture with one another.

Examples of aldehydes which can be used are all compounds of the formula R—CHO where R is alkyl or cyclic for example. Specific examples are formaldehyde, acetaldehyde, propionaldehyde, n-butyric aldehyde or iso-butyric aldehyde, glyoxal or furfural. The preferred aldehyde is formaldehyde, which is used as such or in the form of a substance that cleaves off formaldehyde such as, for example, paraformaldehyde or trioxan. The preferred form of adding it is an aqueous solution with a formaldehyde content of more than 30% (formalin).

Organic phosphonic acids usable according to the invention are organic derivatives of phosphonic acids in which one or several of the groups —$PO(OH)_2$ are bound directly to a carbon atom, and the organic radical can be unsubstituted or substituted alkyl, cycloalkyl, aryl, aralkyl, hetero, heteroalkyl or heteraryl group. Accordingly, the compounds have one or several P—C bonds. Alkyl phosphonic acids are preferably used, in which a branched or unbranched alkyl chains of 2 to 20 carbon atoms is present, to which at least 2 —$PO(OH)_2$ groups are bound. Preferred are such alkyl phosphonic acids which are additionally substituted with one or several polar substituents such as —OH, —OR, —COOH, —COOR, halogen, ≡N, —$NH_2$, —COR or —$NO_2$. Also usable are nitrile derivatives, such as, for example, nitrilotris(alkylene phosphonic acids), particularly nitrilotris(methylene phosphonic acid). Usable salts of these phosphonic acids are the alkali metal and/or alkaline-earth metal salts with all or only a portion of the phosphonic acid groups being present as the salt.

Phosphinic acids are compounds having the formula $R_1R_2P(O)OH$, wherein $R_1$ and $R_2$ are organic residues and can be identical or different. The organic residues can be unsubstituted or substituted alkyl, cycloalkyl, aryl, arylalkyl, hetero, heteroalkyl or heteroaryl groups. Accordingly, the compounds have P—C bonds and preferably used are dialkyl phosphinic acids in which branched or unbranched alkyl chains of 2 to 20 carbon atoms are present to which at least 2 —PO(OH)$_2$ groups are bound. Particularly preferred are dialkyl phosphinic acids in which the alkyl chains are additionally substituted with one or several polar substitutents such as OH, —OR, —COOH, —COOR, halogen, ≡N, —NH$_2$, —NR$_2$, —COR or —NO$_2$. Usable salts of these phosphinic acids are the alkali metal and/or alkaline-earth metal salts, with all or only a portion of the phosphinic acid groups being present as the salt.

The organic phosphonic acid or a mixture of organic phosphonic acids or, respectively, the phosphinic acid or a mixture of phosphinic acids, or a mixture of phosphonic and phosphinic acids, respectively, or their salts or mixtures of corresponding alkali metal or alkaline-earth metal salts is added to the reaction mixture before the condensation reaction, preferably before the addition of the condensation catalyst, in an amount of 0.1 to 10 percent by weight relative to the phenolic compound used.

In view of a frequently desired low aldehyde content of the resin, the condensation mixture can be subjected to a known after treatment with urea after the completed condensation reaction. As a rule, after the condensation or after the urea addition, excess water can be distilled from the reaction mixture by vacuum distillation. The reaction mixture can be adjusted to a pH value in the range of 2 to 9 before or after the vacuum distillation. Suitable for the pH adjustment are mineral acids as well as also carbonic acids. Preferred acids are hydroxy carbonic acids, particularly aliphatic hydroxy carbonic acids and boric acid.

The resin solutions thus obtained are transparent and largely colorless or brightly colored and they remain so even during storage over several weeks. Further improvement of the brightness can be attained thereby if the described condensation reaction is carried out under an inert gas atmosphere as well as by using largely oxygen-free raw materials flushed with inert gas.

At increased temperatures, the resins of the invention are self-curing and also cure at temperatures up to 150° C. without significant deepening of color. But, the resins can also be cured with the aid of curing agents known per se as curing agents for resols. Similarly, the resins of the invention, as is known for resols, can be combined and, if appropriate, cured with other resins and polymers. Examples of such resins or polymers are furan, urea, melamine, epoxide, or polyvinyl resins, preferably polyvinyl butyral. Accordingly, the resins of the invention are used as sole binders or as binder components with other resins or polymers.

In principle, as fields of application are possible all fields known for resols. Due to the brightness of the resins of the invention, however, such applications are possible in which a bright and transparent binder is desired. Such applications are binders for grinding abrasives on substrates, binders or binder components for coated abrasives, coatings, lacquers and varnishes, for printing inks, for adhesives, for the production of laminates, in particular of decorative laminates, in molding materials, foams or formed fiber parts or as impregnation agents.

In the following examples, there are described several preferred embodiments to illustrate the invention. However, it should be understood that the invention is not intended to be limited to the specific embodiments.

EXAMPLE 1 (COMPARISON EXAMPLE)

32 parts by weight of 50% sodium hydroxide solution were added to 500 parts by weight of phenol in 125 parts of weight of water and the solution was thoroughly mixed. The mixture was heated to 60° C. and 760 parts by weight of 45% formalin were added. The condensation reaction was carried out for 5 hours at 60° C. after which, the reaction mixture was subsequently cooled to 40° C., adjusted to a pH value of approximately 7 and adjusted to a viscosity (at 20° C.) of 1000 mPas by vacuum distillation.

The obtained resin solution was yellow-brown and when stored at ambient temperature, it slowly darkened until a dark brown was obtained after approximately 14 days. During the curing of the freshly produced resin at 135° C., discoloration toward deep darkbrown occurred after approximately 2 to 3 hours.

EXAMPLE 2 (COMPARISON EXAMPLE)

A resol was produced analogously to Example 1, and 5 parts by weight of a sodium salt of an alkyl phosphonic acid with 2 carbon atoms were added to the finished resol. The obtained resin solution was yellow brown. When stored at ambient temperature, it slowly darkened until after approximately 14 days, a dark brown was attained. When curing the freshly produced resin at 135° C., discoloration toward deep dark brown occurred after approximately 2 to 3 days.

EXAMPLE 3 (COMPARISON EXAMPLE)

A resol was produced analogously to Example 2 and 5 parts by weight of a hydroxy alkyl diphosphonic acid with an alkyl chain of 9 to 13 carbon atoms were added to the finished resol. The obtained resin solution was yellow brown and when stored at ambient temperature, it slowly darkened until a dark brown was attained after approximately 14 days. When curing the freshly produced resin at 135° C., discoloration toward a deep dark brown occurred after approximately 2 to 3 hours.

EXAMPLE 4

A resol was produced analogously to Example 1, with the sole change Nbeing that, before the addition of the sodium hydroxide solution, to the mixture comprising phenol and water, 5 parts by weight of a hydroxy alkyl diphosphonic acid with an alkyl chain of 9 to 13 carbon atoms were added thereto. The obtained resin solution was light yellow and when stored at ambient temperature, only a slight color deepening occurred within 14 days. When curing the freshly produced resin at 135° C. as well as at 150° C., only a slight color deepening occurred after approximately 2 to 3 hours and the cured resin was yellow and transparent.

EXAMPLE 5

A resol was produced analogously to Example 4, wherein the reaction took place under a nitrogen atmosphere and the raw materials used were treated before by passing nitrogen through them. The obtained resin solution was nearly colorless and when stored at ambient temperature, no color change occurred within 14 days. When curing the freshly produced resin at 135° C. as well as at 150° C., only a slight color deepening occurred after approximately 2 to 3 hours. The cured resin was yellowish and transparent.

EXAMPLE 6

A resol was produced analogously to Example 1, wherein the sole change is that before the addition of the sodium hydroxide solution to the mixture of phenol and water, 5 parts by weight of a Na salt of a hydroxy alkyl diphosphonic acid with an alkyl chain of 9 to 13 carbon atoms were added thereto. The obtained resin solution was yellow and when stored at ambient temperature, only minimal color deepening occurred within 14 days.

EXAMPLE 7

A resol was produced analogously to Example 5, wherein the sole change is that before the addition of the sodium hydroxide solution to the mixture of phenol and water, 5 parts by weight of a Na salt of an alkyl diphosphonic acid with an alkyl chain of 2 carbon atoms were added thereto. The obtained resin solution was yellow and when stored at ambient temperature, only minimum color deepening occurred within 14 days.

Various modifications of the products and process of the invention may be made without departing from the spirit or scope thereof and it is to be understood that the invention is intended to be limited only as defined in the appended claims.

What we claim is:

1. A resol modified during condensation of phenol or aliphatically or aromatically substituted phenols free of sulfonate or carboxylate groups and aldehyde with at least one member of the group consisting of organic phosphonic acids, organic phosphinic acids and their alkali metal and alkaline earth metal salts.

2. A phenolic-aldehyde resol of claim 1 comprised of a phenolic compound to aldehyde in a molar ratio of 1:0.3 to 1:6 and containing during condensation 0.1 to 10% by weight of at least one member of the group consisting of organic phosphonic acid, organic phosphinic acid and their alkali metal and alkaline earth metal salts.

3. A process for the preparation of a resol of claim 2 comprising reacting a mixture of phenolic compound and aldehyde in a molar ration of 1:0.3 to 1:6 in the presence of 0.1 to 10% by weight of at least one member of the group consisting of organic phosphonic acid, organic phosphinic acid and their alkali metal and alkaline earth metal salts in an alkaline medium.

4. The process of claim 3 wherein organic phosphonic acid and/or organic phosphinic acid or their salts are added to the phenolic compound before the alkaline catalyst.

5. The process of claim 3 wherein the organic phosphonic acid is a hydroxyalkyl phosphonic acid with at least one phosphonic acid moiety in the molecule.

6. The process of claim 3 wherein the organic phosphinic acid is a hydroxyalkyl phosphinic acid with at least one phosphinic acid moiety in the molecule.

7. The process of claim 3 wherein the reaction is effected under an inert gas atmosphere.

8. The process of claim 7 wherein the reactants are oxygen-free.

9. A coated abrasive containing a resol of claim 1 as the binder for the abrasive.

10. A coating agent containing a resol of claim 1 as the binder.

11. A lacquer or varnish containing a resol of claim 1 as the binder.

12. A molding material containing a resol of claim 1 as a binder.

13. A foam containing a resol of claim 1 as a binder.

14. A printing ink containing a resol of claim 1 as a binder.

15. An adhesive containing a resol of claim 1 as a binder.

16. A formed fiber element containing a resol of claim 1 as a binder.

17. A laminate containing a resol of claim 1 as a binder.

18. A decorative laminate containing a resol of claim 1 as a binder.

19. An impregnating resin containing a resol of claim 1 as a binder.

* * * * *